US005212902A

United States Patent [19]
Moorhead et al.

[11] Patent Number: 5,212,902
[45] Date of Patent: May 25, 1993

[54] CONTAINER FOR FISH AND OTHER ITEMS AND SEPARATOR THEREFOR

[76] Inventors: Jack B. Moorhead, 822 Hedwig Way, Houston, Tex. 77024; Guy L. McClung, III, 8130 Vintage Creek, Spring, Tex. 77379

[21] Appl. No.: 743,056

[22] Filed: Aug. 9, 1991

Related U.S. Application Data

[63] Continuation-in-part of Ser. No. 436,354, Nov. 14, 1989, Pat. No. 5,038,515.

[51] Int. Cl.$^5$ .............................................. A01K 97/00
[52] U.S. Cl. ............................................ 43/55; 43/56; 43/54.1
[58] Field of Search ........................... 43/54.1, 55, 56

[56] References Cited

U.S. PATENT DOCUMENTS

| 594,448 | 11/1897 | Webber | 43/55 |
|---|---|---|---|
| 1,023,531 | 4/1912 | Shafer | 43/55 |
| 1,230,914 | 6/1917 | McMoore . | |
| 1,983,139 | 12/1934 | Lovell | 43/55 |
| 2,016,488 | 10/1935 | Eckhaus | 43/56 |
| 2,097,186 | 10/1937 | Hinnenkamp | 43/56 |
| 2,297,843 | 10/1942 | Sharpnack | 43/56 |
| 2,651,137 | 9/1953 | Sweet | 43/56 |
| 2,693,661 | 11/1954 | Piker et al. | 43/56 |
| 2,717,469 | 9/1955 | Piker et al. | 43/56 |
| 2,740,546 | 4/1956 | Kowalski | 43/56 |
| 3,025,629 | 3/1962 | Sears | 43/55 |
| 3,315,402 | 4/1967 | Scott et al. | 43/55 |
| 3,338,068 | 8/1967 | Piker | 62/398 |
| 3,387,650 | 6/1968 | Hoffmann et al. | 165/75 |
| 3,395,550 | 8/1968 | Dungan | 62/400 |
| 3,399,938 | 9/1968 | Wallace | 312/214 |
| 3,406,532 | 10/1968 | Rowind et al. | 62/457 |
| 3,452,469 | 7/1969 | White | 43/55 |
| 3,559,329 | 2/1971 | Chiu | 43/55 |
| 3,678,611 | 7/1972 | Files . | |
| 3,979,007 | 9/1976 | Thornbloom, Jr. | 220/23 |
| 4,008,540 | 2/1977 | Brower | 43/55 |
| 4,024,731 | 5/1977 | Branscum | 62/457 |
| 4,070,786 | 1/1978 | Dunham | 43/55 |
| 4,106,829 | 8/1978 | Dolle et al. | 312/235 |
| 4,128,170 | 12/1978 | Elliott . | |
| 4,213,310 | 7/1980 | Buss | 62/457 |
| 4,500,059 | 2/1985 | Papizan . | |
| 4,555,862 | 12/1985 | Panasewich | 43/54.1 |
| 4,638,593 | 1/1987 | Garcia . | |
| 4,651,538 | 3/1987 | Bull et al. | 62/398 |
| 4,671,008 | 6/1987 | Lindemood . | |
| 4,681,219 | 7/1987 | Kitchens . | |
| 4,794,723 | 1/1989 | Arnold et al. . | |
| 4,841,661 | 6/1989 | Moore | 43/54.1 |
| 4,861,301 | 8/1989 | Pomeroy et al. . | |
| 4,864,769 | 9/1989 | Sandahl | 43/55 |
| 4,870,778 | 10/1989 | Sheppard | 43/55 |
| 4,871,079 | 10/1989 | Doucette et al. . | |
| 4,878,311 | 11/1989 | Cano . | |
| 4,981,232 | 1/1991 | Wynn | 220/22.3 |
| 4,981,234 | 1/1991 | Slaughter | 220/415 |
| 4,988,216 | 1/1991 | Lyman | 383/74 |
| 4,996,790 | 3/1991 | Ruggles . | |
| 5,005,847 | 4/1991 | King et al. . | |
| 5,050,335 | 9/1991 | Hisey . | |
| 5,050,535 | 9/1991 | McKellar et al. . | |
| 5,052,184 | 10/1991 | Jarvis . | |
| 5,052,185 | 10/1991 | Spahr . | |

Primary Examiner—Kurt C. Rowan
Attorney, Agent, or Firm—Guy McClung

[57] ABSTRACT

A container for fish and other things and a receiving device for use with containers or with receptacles for fish; and other things. A separation device for use in a container for fish and other things such as food, drinks, cans, bottles, bait, sandwiches, etc; a container with such a separation device; the separation device in one aspect having two or more spaces or compartments and the container having two or more openings corresponding to the separation device's spaces.

5 Claims, 6 Drawing Sheets

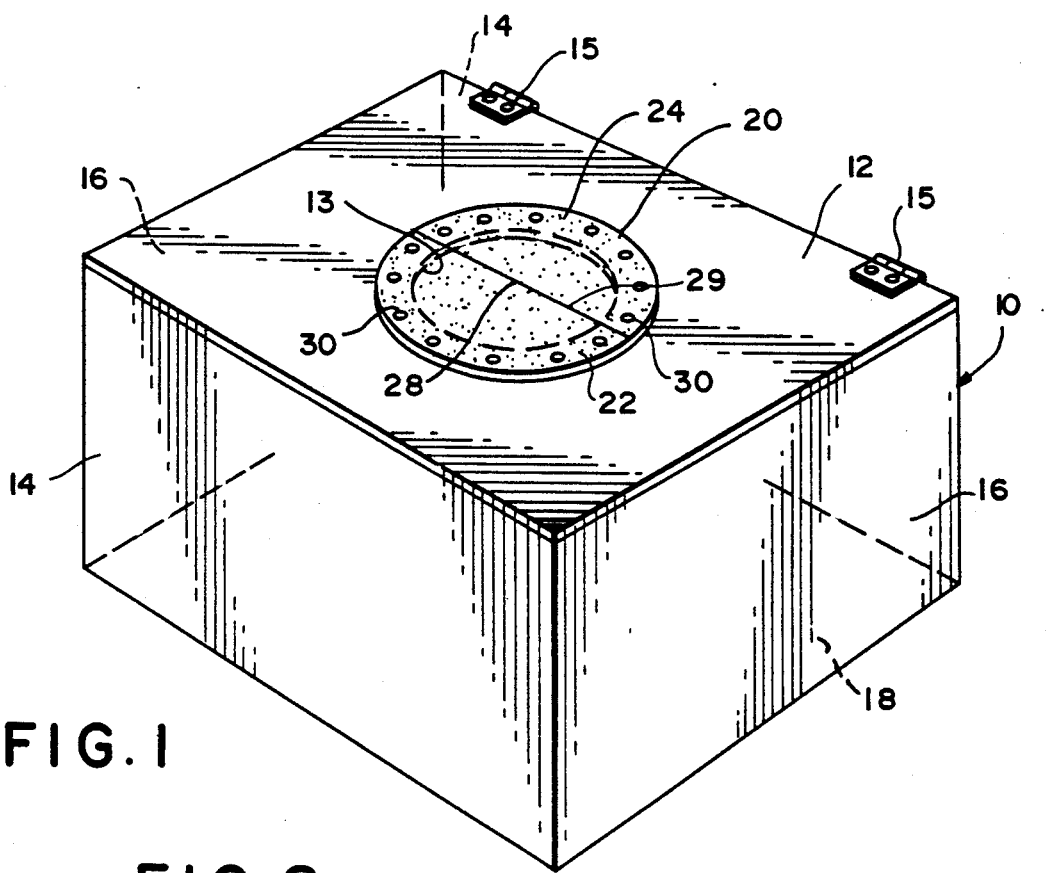
FIG. 1
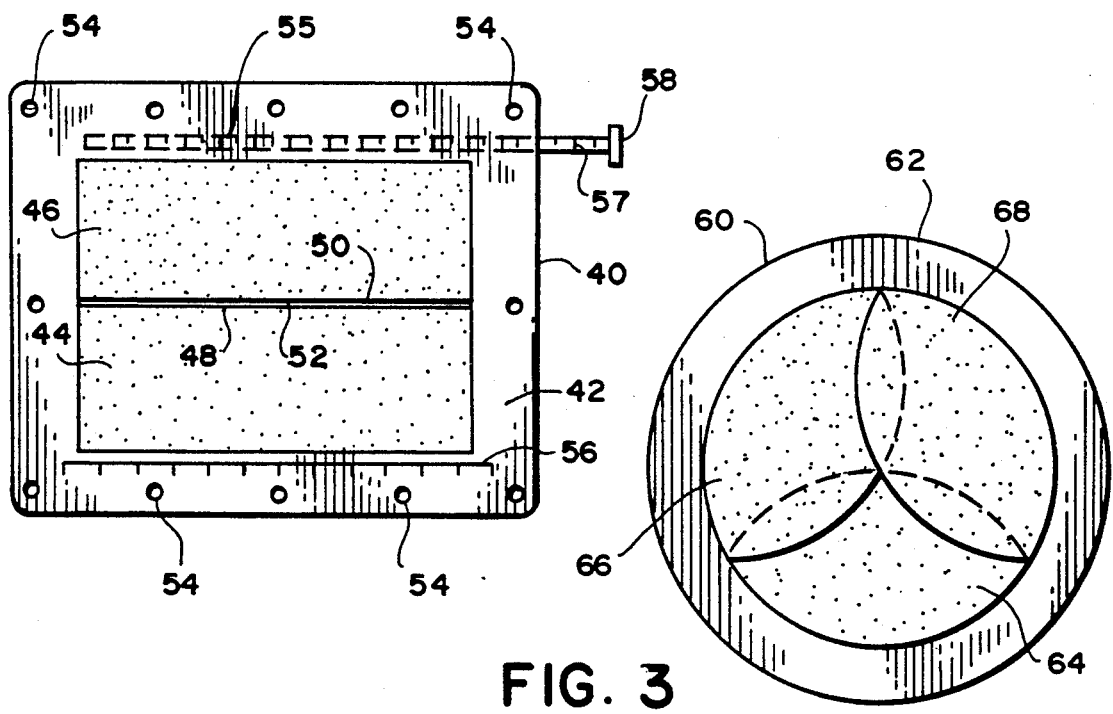
FIG. 2
FIG. 3

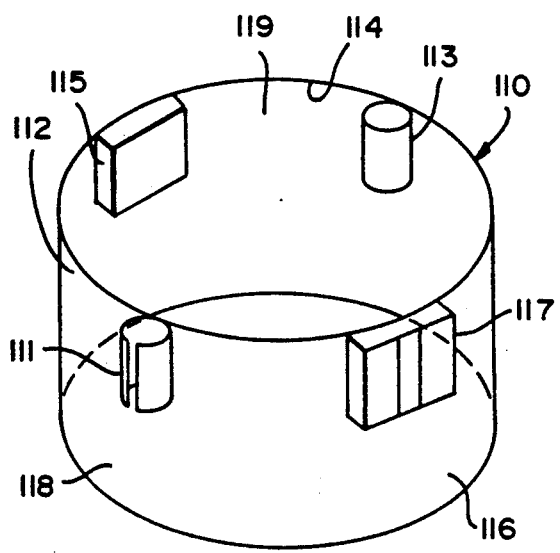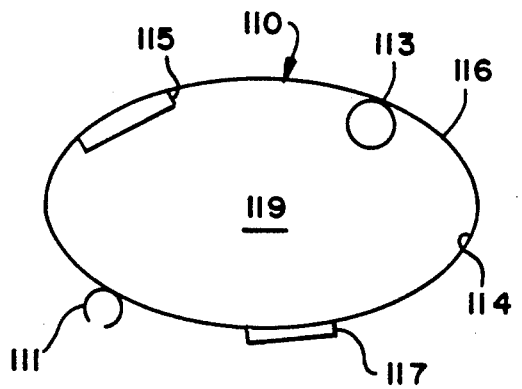
FIG.5a
FIG.5b
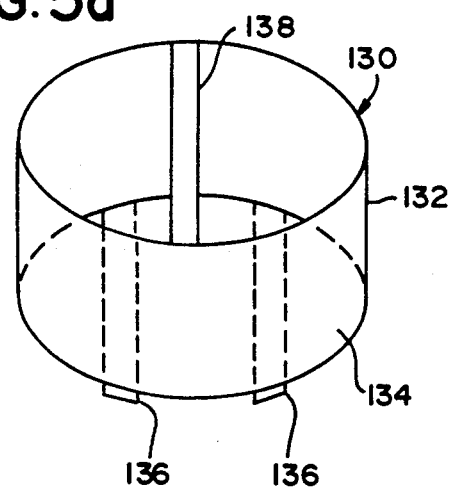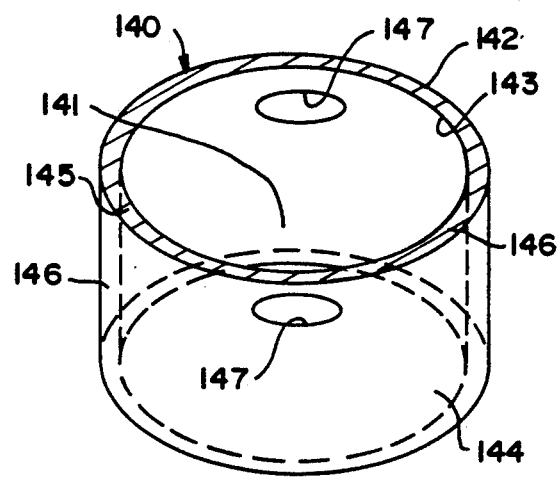
FIG.6
FIG.7
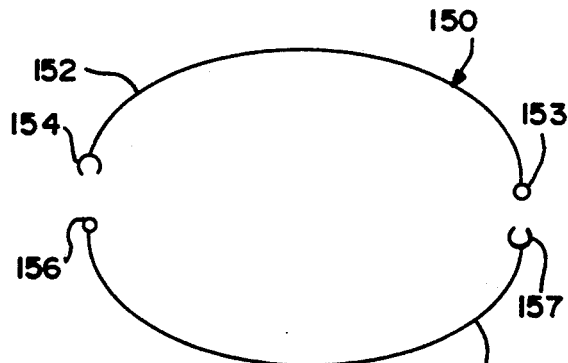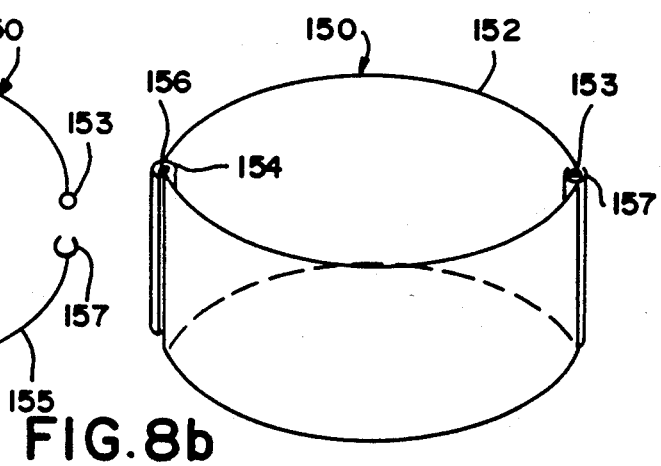
FIG.8a
FIG.8b

CONTAINER FOR FISH AND OTHER ITEMS AND SEPARATOR THEREFOR

RELATED APPLICATION

This is a continuation-in-part of U.S. application Ser. No. 07/436,354 filed on Nov. 14, 1989 issuing as U.S. Pat. No. 5,038,515 on Aug. 13, 1991.

BACKGROUND OF THE INVENTION

1. Field of the Invention

This invention is related to: containers and ice chests having apparatus into and through which live fish, live or dead bait, or other items can be inserted and removed without opening the container or ice chest; and to separators for such containers.

2. Background of the Invention

In many types of sport fishing, such as fishing from boats and piers, and fishing on a bank or shore, anglers have a container or ice chest nearby for keeping recently-caught fish, food, live or dead bait, drinks and other items. When a fish is caught, the container is opened; with ice chests the fish is placed on ice in the ice chest.

Keeping the fish on ice serves a number of purposes such as maintaining the freshness, and sometimes taste, of the fish, as well as keeping the fish meat at a consistency that facilitates cleaning and filleting. It is very convenient to keep a fish in this way without having to clean the fish immediately, particularly when the fishing gets "hot" and the angler is catching many fish in a short time period. Keeping dead bait on ice keeps it "fresh". Often in adverse weather, live bait is kept in a container, insulated or otherwise, to maintain the live bait in a certain temperature range to keep it alive as long as possible.

Several problems are related to the prior art method of placing fish or other things in a container or in an ice chest. Initially, while holding a rod and reel in one hand and a fish in the other, an angler must either set the rod down or try to open the container while holding the rod.

In a crowded boat this can require great dexterity, particularly with a wiggling live fish of any size. Once an ice chest is open, and each time it is open, ice therein is subjected to warm air. Consequently, the ice melts more quickly than it would if the chest remained closed. Often a single container is used for both bait, refreshments, and live fish that are caught. This container must be opened whenever any one of these items is to be removed from or put into the container.

Usually a layer of ice is placed in a container and live fish, as they are caught, are placed on this layer of ice. Thus only one side of the fish is on the ice. If the fishing is fast and furious there is no time to cover the fish with ice.

There has long been a need for a container into which a live fish and other things can be quickly and efficiently inserted or from which they can be removed. There has long been a need for an ice chest for keeping fish in which ice therein is subjected to a minimum of hot air outside the chest. There has long been a need for a way to provide a cold area around, in addition to beneath, a fish in a container.

SUMMARY OF THE PRESENT INVENTION

The present invention is directed to: a container or ice chest for receiving and keeping fish and other things such as food, drinks and bait; and to an apparatus for receiving fish and other things and through which fish and other things can be inserted or removed which is useful with containers or ice chests for fish. In one embodiment a container according to this invention has a box member with a bottom wall and four side walls and a lid wall member hingedly connected to the box member. In one of the walls, for example in a lid wall, there is a fish receiving device mounted over a hole in the wall. In one embodiment the fish receiving device includes pieces of fabric mounted over the hole to cover the hole with edges of the fabric meeting over the hole so that there is an opening between the two fabric pieces over the hole through which a fish or other item can easily be inserted into or removed from the container.

In other embodiments the two fabric pieces can be positioned so that one overlaps the other slightly without impeding the insertion of a fish into the chest. In other embodiments a separate door, lid, flap, or piece of fabric can be movably connected to the chest wall adjacent the fish receiving device to provide a cover over the opening between fabric pieces. It can be hingedly connected to the wall or it can be slidingly mounted in the wall.

In other embodiments a single fabric piece with a slit in it can be used rather than multiple pieces or a plurality of interleaved or overlapping pieces can be employed to cover the hole in the chest. In other embodiments the fish receiving device can be in the lid wall or in a side wall. In other embodiments the container can be of a variety of shapes with a fish receiving device as previously described; for example the container can be of any particular shape suitable for holding fish, including but not limited to spherical or cylindrical, and the fish receiving device can be located anywhere on the container where it is accessible by an angler. The use of multiple interleaved pieces provides added insulation over an opening.

Although the size of the container or ice chest is not limited by this invention, in one particular embodiment a container is provided which is small enough to be carried by an angler, e.g., on a strap over the angler's shoulder or on a belt around an angler's waist. Also, in one embodiment of this invention there is a container for fish with any of the previously described fish receiving devices, but which container is not necessarily an ice chest or an insulated container.

In another embodiment of this invention a fish receiving device is provided which has a frame and an opening member mounted to the frame through which a fish or other item can be inserted, the fish receiving device suitable for incorporation on a container or ice chest.

In another embodiment a container according to the present invention includes a container (with or without insulation added to some or all of its side walls, bottom wall, or to a top closure cover) and separation device within the container for providing a barrier within the container which will maintain ice on one side of the separation device, the separation device having an interior portion for receiving fish or other things. The separation device may be a hollow walled member without a bottom wall or it may have a bottom wall. It may be formed integrally of or secured to the container's interior wall; it may be unconnected to the container; or it may be releasably connected within the container. The separation device may be any shape which will permit it to be contained within the container and provide defined spaces in the container. One or more holders may be provided on either side of the separation device for bottles, cans sandwiches, containers, etc., to hold such things in the ice, away from the ice, above the ice, apart from other items, or apart from bait or fish. One or more handles may be provided for lifting the separation device. The separation device itself may be partially or wholly insulated. Also, the separation device itself may be made of two or more releasably connectable pieces. The pieces may be formed so they can be nested within one another for easy storage. Such pieces may also be flexible to enhance handling and storage. Devices for securing such a separation device within a container may also be configured and disposed to serve as spacers for maintaining the separation device in position within a container.

A separation device according to this invention may have two or more interconnected or isolated spaces or compartments, one or more of which may be partially or wholly insulated. A container according to this invention used with such a separation device may have two or more openings each with a receiving device at the opening according to this invention, and with openings corresponding to each of the two or more spaces or compartments in the separation device.

In another embodiment of this invention, a container is provided with side walls, a bottom, and a top closure member with a scale device thereon, the scale device having an immovable scale imprinted thereon or immovably secured thereto and a movable scale thereon or therein which can extend to measure a fish or other item larger than the full extent of the immovable scale.

The present invention solves the problems with prior art ice chests and containers described above. The present invention recognizes, addresses and satisfies the long-felt needs described above.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, a more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 1 is a perspective view of a container according to the present invention.

FIG. 2 is a top plan view of a fish receiving device according to the present invention.

FIG. 3 is a top plan view of a fish receiving device according to the present invention.

FIG. 5a is a perspective view of a separation device according to the present invention. FIG. 5b is a top view of the device of FIG. 5a.

FIG. 6 is a perspective view of a separation device according to the present invention.

FIG. 7 is a perspective view of a separation device according to the present invention.

FIG. 8a is a top view of a separation device according to the present invention. FIG. 8b is a perspective view of the device of FIG. 8a.

DESCRIPTION OF EMBODIMENTS PREFERRED AT THE TIME OF FILING FOR THIS PATENT

Figure 4A:
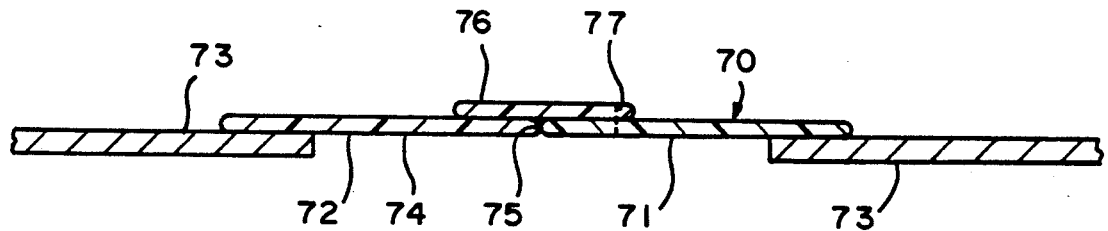
FIG. 4a–4d are side cross-sectional views of fish receiving devices according to the present invention useful with containers according to the present invention.

As shown in FIG. 1 a container 10 according to the present invention has a receptacle for fish formed by connected walls including side walls 14 and 16, bottom wall 18, and a top wall which serves as a movable lid 12, the lid 12 movably secured to the side wall 14 by hinges 15 for opening and closing the container 10.

Over a hole 13 in the lid 12 is mounted a fish receiving device 20 which has two pieces of fabric or flexible material fastened to the lid 12 by fasteners 30 such as staples or screws. In one preferred embodiment, the fabric used is rubberized fabric cut from an exercise belt to a desired size and it is secured to the lid with elongated metal strips (not shown) through which screws are placed and then secured into the lid. Although a space could be left between the fabric pieces, it is preferred that the edges 28 and 29 of the fabric pieces 22 and 24 respectively meet over the hole 13. Due to the flexibility of the fabric, when a fish is inserted at the point where the edges 28, 29 meet, the fish can easily pass between the fabric pieces and into the container 10. The device 20 also prevents fish from escaping through the hole 13.

The hole 13 can be sized as desired and it can be placed on the lid 12 or in one of the side walls so that it is easily accessible by a person with a fish to be placed in the container. Some or all of the container's walls and lid can be insulated. The container can be an ice chest such as many anglers use for receiving and keeping fish until they cleaned and the opening of the fish receiving device can be sized as desired and shaped as desired.

As shown in FIG. 2, a fish receiving device 40 according to the present invention has a rectangular frame 42 to which are secured, e.g. by adhesives or fasteners, two pieces of fabric 44 and 46 which have edges 48 and 50, respectively, which meet along a line 52. A plurality of holes 54 are provided in the frame 42 for facilitating the mounting of the device 40 over a hole in a fish keeping container or a fish transmitting apparatus. A fish can be inserted through the device 40 between the flexible fabric pieces.

As shown in FIG. 3, a fish receiving device 60 has a circular frame 62 to which are secured three overlapping, interleaved fabric pieces 64, 66, and 68. The device 60 can be mounted over or in a hole in a container for fish or a fish transmitting apparatus. Due to the flexibility of the fabric pieces 64, 66, 68 and their disposition about the frame 62, a fish can be inserted easily through the device 60. Of course, two or more interleaved pieces may be used according to this invention. The use of multiple pieces increases the insulative effect over the opening.

FIGS. 4a through 4d illustrate various embodiments of fish receiving devices according to the present invention which when incorporated in a container produce a container for fish according to the present invention. A fish receiving device 70 has two pieces of fabric or flexible material 71, 72 each of which is secured to a wall 73 or a container (not shown entirely) over a hole 74. The pieces of fabric 71 meet along a line 75 and a piece of fabric 76 secured to the piece of fabric 71 by stitching 77 partially covers the fabric pieces 71, 72 including the line 75 along which they meet. The piece of fabric 76 can be moved upwardly or it can be pushed inwardly, e.g. by a fish inserted into the hole 74.

Figure 4B:
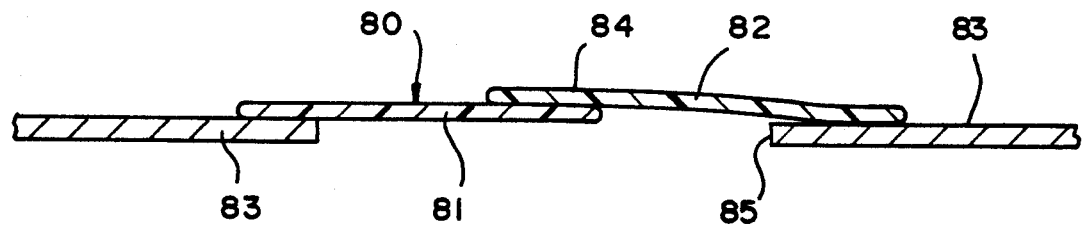
Figure 4C:
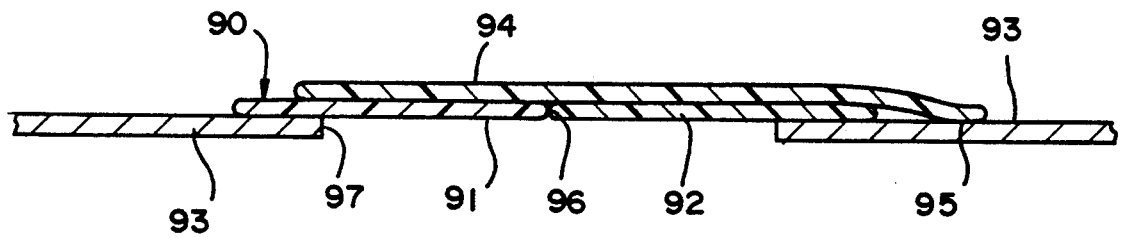

As shown in FIG. 4b a fish receiving device 80 has two pieces of fabric 81, 82 secured to a lid 83 of a container (not shown entirely). A portion 84 of fabric piece 82 overlaps fabric piece 81. As shown in FIG. 4c a fish receiving device 90 has two pieces of fabric 91, 92 secured to a lid 93 of a container, the container having a hole 85 for inserting fish into the container (not entirely shown) which has a hole 97 for receiving fish and a third piece of flexible fabric 94 is movably secured to the lid 93 at point 95 such as by a fastener or by an adhesive. The fabric piece 94 overlaps the area 96 where the fabric pieces 91, 92 meet. Of course, piece 94 could be extended to cover the entire area above the hole 97.

Figure 4D:
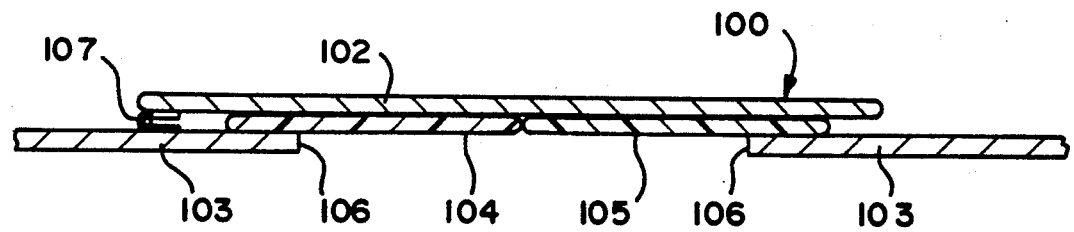

FIG. 4d shows a fish receiving device 100 like that of FIG. 1 (device 20) with the addition of a solid cover 102 hingedly connected with a hinge 107 to a lid 103 of a container (not entirely shown). The cover 102 covers two pieces of fabric 104, 105 (which function like the fabric pieces 22, 24 of the device 20) which are secured to the lid 103 over a hole 106. By eliminating the hinge 107 and providing a suitable space within the lid 103, the cover 102 can be converted into a sliding-door-type cover (not shown).

Each of the devices shown in FIGS. 4a-4d facilitate the insertion of a fish or other item into a container and prevent a fish from jumping out through a hole in the container over or in which the device is mounted. When the container is an insulated container, e.g. an ice chest, the various overlapping fabric pieces or cover enhance the insulative effect of the devices by covering the points or line along which fabric pieces meet and providing a second cover for some or all of the hole in the container. The use of thicker and/or rubberized or treated fabric adds to the insulative effect of the fabric.

As shown in FIG. 2 a scale 56 can be included on the frame 42 for measuring a fish. Also an extensible member 58 with a scale 57 thereon can be movably disposed between the underside of the frame 42 and the surface of a container on which is mounted the device 40. The member 58 can be moved outwardly to accommodate a fish and it may be used in conjunction with a scale 55 on the frame 42; or the member 58 may be used alone.

A separation device 110 shown in FIG. 5a and FIG. 5b according to this invention has a side wall member 112 with an interior surface 114, an exterior surface 116, and a bottom 118 (although it is within the scope of this invention to eliminate the bottom 118) which define a central space 119 within the device 110. The device 110 is sized and shaped for disposition in a container (not shown) so that the container may be closed with the device 110 therein. The container may be, e.g., a box with a movable cover, a chest, or an insulated chest.

In the embodiment shown in FIG. 5a and 5b, an amount of ice may be placed in a box, then the device 110 may be placed on the ice in the box. Then ice is placed along the sides between the interior surface of the box and the exterior surface of the device 110 to provide ice around any fish or other items placed in the space 119. Alternatively, ice could be placed in the space 119 and not outside of the device 110.

Holders 111 and 113 secured to or formed integrally of the side wall member 112 are suitable for holding cans or bottles either above a level of ice or in ice. Similarly holders 115 and 117 may accommodate items of different configuration. Although holders are shown of a specific shape and design, it is within the scope of this invention to provide holders of any desirable shape. Also, holders may be provided at any location on the separator. Such holders may be used on any of the embodiments described herein. By providing holders at a position above the bottom of the side wall, items in the holders are held above water resulting from melting ice.

FIG. 6 shows a separation device 130 according to the present invention which has a side wall member 132, a bottom member 134, and two support beams 136 formed of or secured to the bottom member 134. A handle 138 extends across the side wall member 132. The device 130, like the device 110 (FIG. 5a, 5b) is sized and configured to fit in an ice chest or other container to define separate spaces in the container and allow ice to be placed only in one of the defined spaces, if desired. Thus water produced by melting ice, e.g., on the outside of the separation device may not get into the central space within the device. Also, by packing ice up around the sides of the device, a larger cold environment is created for fish or other items within the separation device. The side wall member 132 and the bottom member 134 may be made of thin yet rigid plastic or metal so that the insulative effect of them is reduced (the other side walls and bottoms of other embodiments described herein may similarly be made from such plastic or metal).

FIG. 7 illustrates a separation device 140 according to the present invention with an outer side wall member 142, and inner side wall member 143, and a bottom member 144 which define a central space or compartment 141 and an inner space 145 between the walls. Insulation 146 may be disposed between the side walls as shown, or the space may be left empty to receive items such as food, bottles, cans, containers, etc., with or without a bottom or a top layer, or both, of ice. The space between the side walls, when no insulation is used, may be sized to accommodate items as desired. Cutouts 147 provide recesses for gripping and lifting the device 140.

FIGS. 8a and 8b show a separation device 150 which illustrates that an separation device according to this invention may, if desired, be made from more than one piece so that it is disassemble able for ease of handling or storage. The device 150 has a first member 152 with a beaded end edge 153 and a socket end edge 154 and a second member 155 With a beaded end edge 156 and a socket end edge 157. As shown in FIG. 8b the two pieces have been releasably joined together by inserting the beaded end edge 153 into the socket end edge 157 and by inserting the beaded end edge 156 into the socket end edge 154. When a separation device includes a bottom member, similar bead and socket connection between bottom member halves is provided. It is to be understood that any releasably connection between parts known in the art, e.g. but not limited to tongue and-groove, Velcro TM fasteners, typical plastic bag closure members or latches may be used according to this invention. The pieces, whether they are elliptical as shown, circular, squared, rectangular, etc. may be sized and configured to be nestable within each other. The use of flexible material for the pieces may contribute to this nestability.

Figure 9:
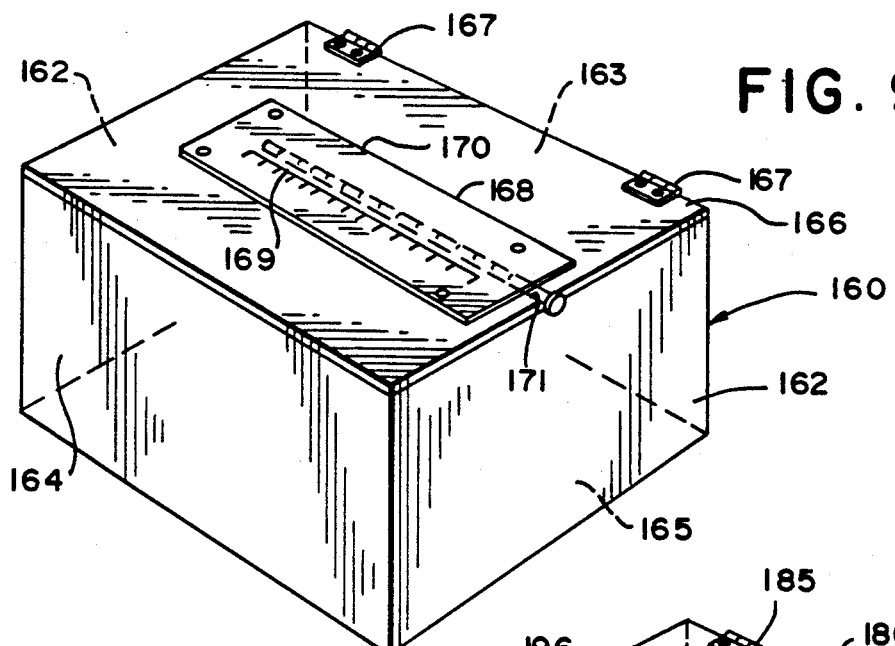
FIG. 9 is a perspective view of a container according to the present invention.

A container 160 according to the present invention shown in FIG. 9 has side walls 162, front wall 164, rear wall 163, bottom 165, and top closure cover 166 hingedly connected to the rear wall with hinges 167. Secured to the top of the container 160 is a scale device 168 with an immovable scale 169 imprinted on or embossed in a member 170 and with a movable scale member 171 movably disposed in or beneath the member 170. The movable scale member 171 increases the measuring capability of the scale device 168 beyond that of the immovable scale alone.

Figure 10:
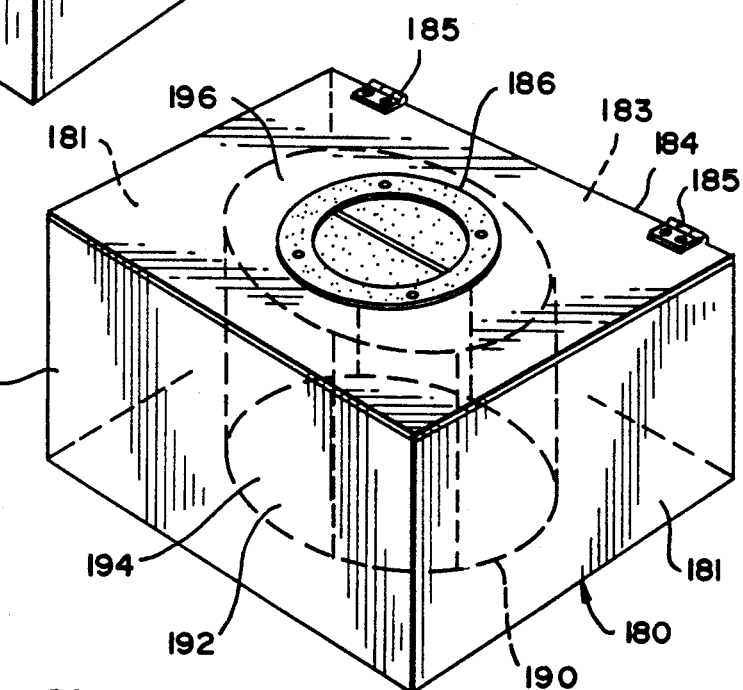
FIG. 10 is a perspective view of a container according to the present invention.

FIG. 10 illustrates a container 180 according to the present invention with side walls 181, a front wall 182, and rear wall 183 and a top closure cover 184 hingedly connected to the rear wall with hinges 185. Disposed within the container 180 is a separation device 190 according to the present invention with a side wall member 192 and a bottom member 194 defining a central interior compartment 196. A receiving device 186 (like the device 20 described above) in the top closure cover 184 has its opening disposed above the compartment 196 of the separation device 190 so that a fish or other item inserted through the device 186 enters the compartment 196.

Figure 11:
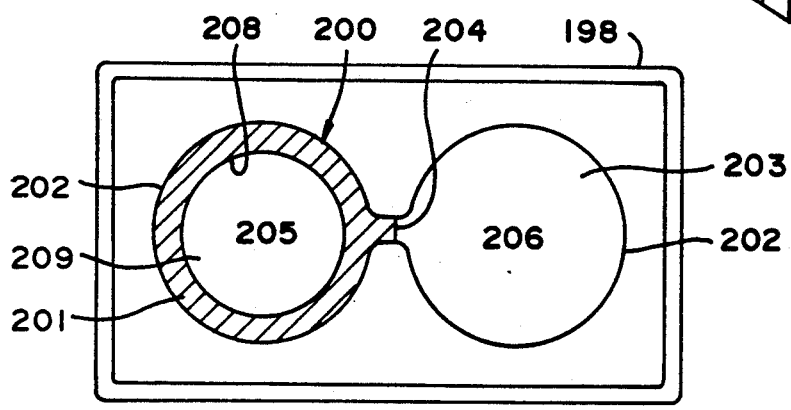
FIG. 11 is a top view of a container according to the present invention with a separation device according to the present invention.

FIG. 11 is a top view of a container 198 with a separation device 200 according to the present invention with an exterior side wall 202, a bottom wall 203 and a cross wall 204 that defines a first interior compartment 206 and an inner side wall 208 and bottom member 209 that define a second interior compartment 205. Insulation 201 between the walls 202 and 208 make it possible to maintain the temperature of the compartment 205 at a different level than that of compartment 206, even when ice is between the interior of the container 198 and the wall 202.

Figure 12:
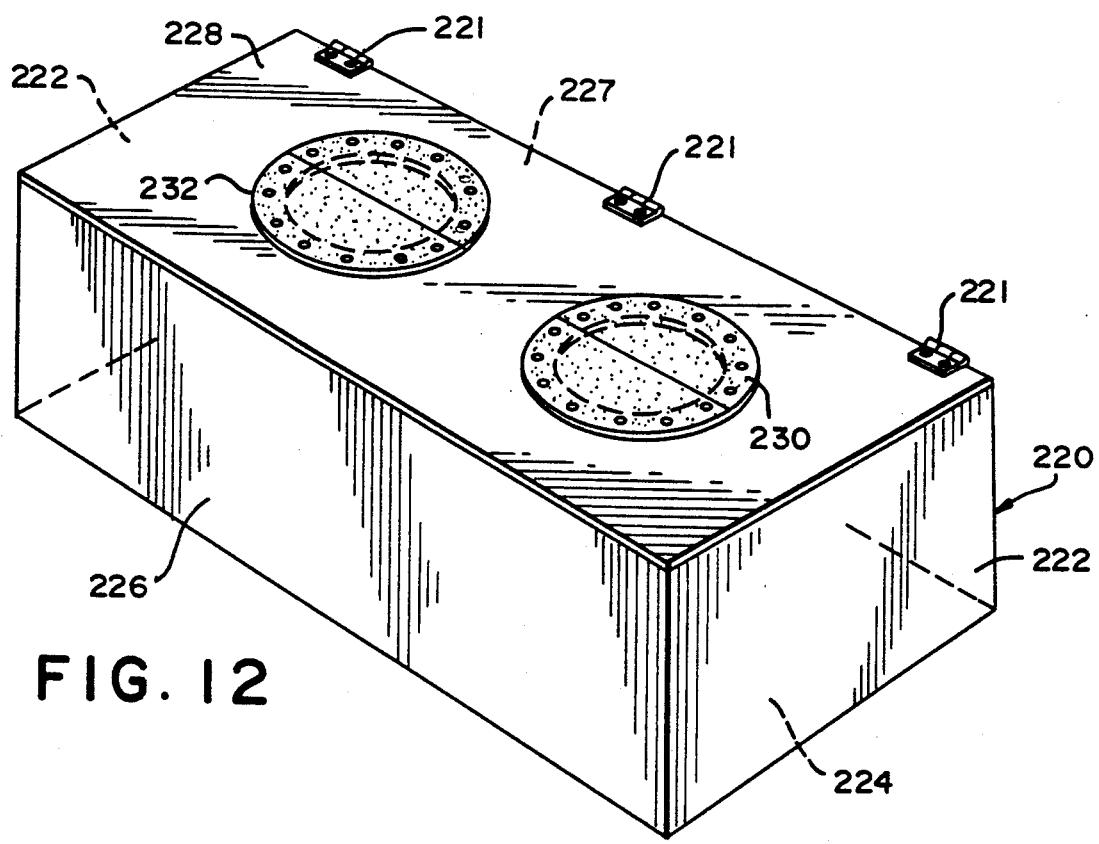
FIG. 12 is a perspective view of a device according to the present invention.

A container 220 according to the present invention as shown in FIG. 12 has end walls 222, bottom wall 224, front wall 226, rear wall 227, and movable top 228 hingedly connected to the rear wall 227 with hinges 221. Two receiving devices 230 (like device 20, FIG. 1) and 232 (like device 60, FIG. 3) are disposed on top 228 over openings therethrough (not shown). With two such devices (230, 232) one type of item, e.g. canned drinks, can be placed in one portion of the interior of the container 220 and another type of item, e.g. live fish, can be inserted through the other opening into another portion of the container 220.

Figure 13:
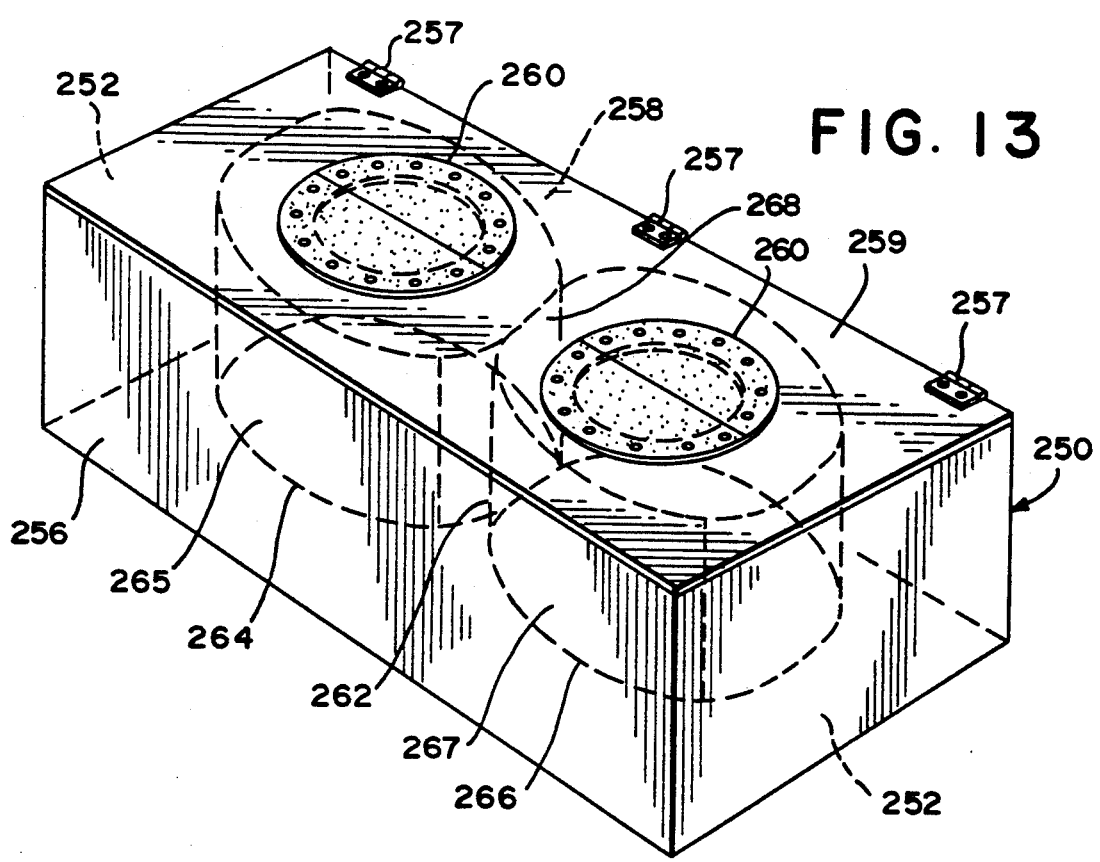
FIG. 13 is a perspective view of a device according to the present invention.

A container 250 according to the present invention shown in FIG. 13 has end walls 252, a front wall 254, a bottom 256, a rear wall 258 and a top 259 hingedly connected to the rear wall with hinges 257. Two receiving devices 260 are disposed on the top 259 over openings in the top (not shown). It is to be understood that the receiving device 260 represent any receiving device described herein.

A separation device 262 according to the present invention is disposed within the container 250. Side wall members 264 and 266 of the device 262 are formed of or sealingly secured to the bottom 256 of the container 250. The side wall members are interconnected by a central wall 268 between them. A compartment 265 defined by the side wall member 264 and the bottom 256 is disposed beneath one of the receiving devices 260 and a compartment 267 defined by the side wall 266 and the bottom 256 is disposed beneath the other receiving device 260.

Figure 14:
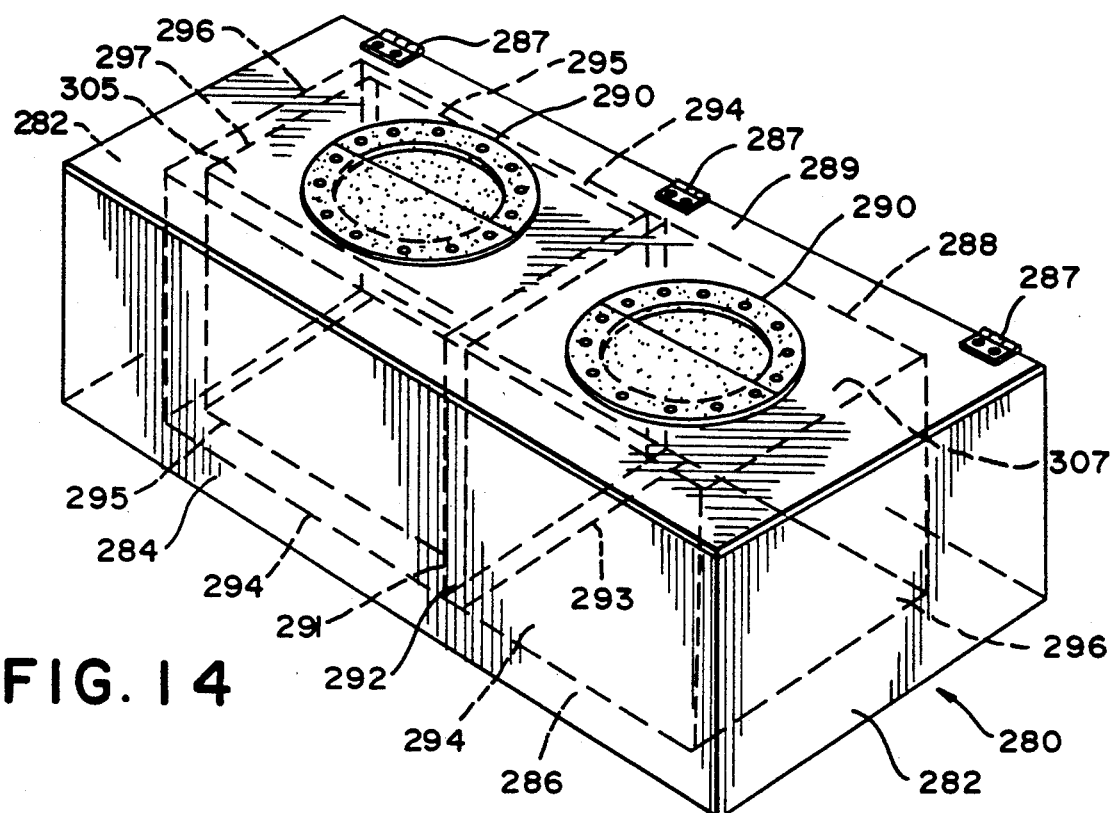
FIG. 14 is a perspective view of a device according to the present invention.

A container 280 according to the present invention shown in FIG. 14 has end walls 282, a front wall 284, a bottom 286, a rear wall 288 and a top 289 hingedly connected to the rear wall with hinges 287. Two receiving devices 290 are disposed on the top 289 over openings in the top (not shown). It is to be understood that the receiving device 290 represent any receiving device described herein.

A separation device 292 according to the present invention is disposed within the container 280. Wide member 294 and 195 and end wall member 296 and 197 of the device 292, as well as middle walls 291 and 293 are formed of or sealingly secured to the bottom 286 of the container 280. A compartment 305 defined by the wall members 297,295 and 291 and the bottom 286 is disposed beneath one of the receiving devices 290 and a compartment 307 defined by the wall members 293, 294 and 296 and the bottom 286 is disposed beneath the other receiving device 290. Spaces between the wall members 196, 297; 294, 295, and 291, 293 provides insulation for the compartment 305. If desired, further insulation material, not shown, may be put in any or all of these spaces.

Figure 15:
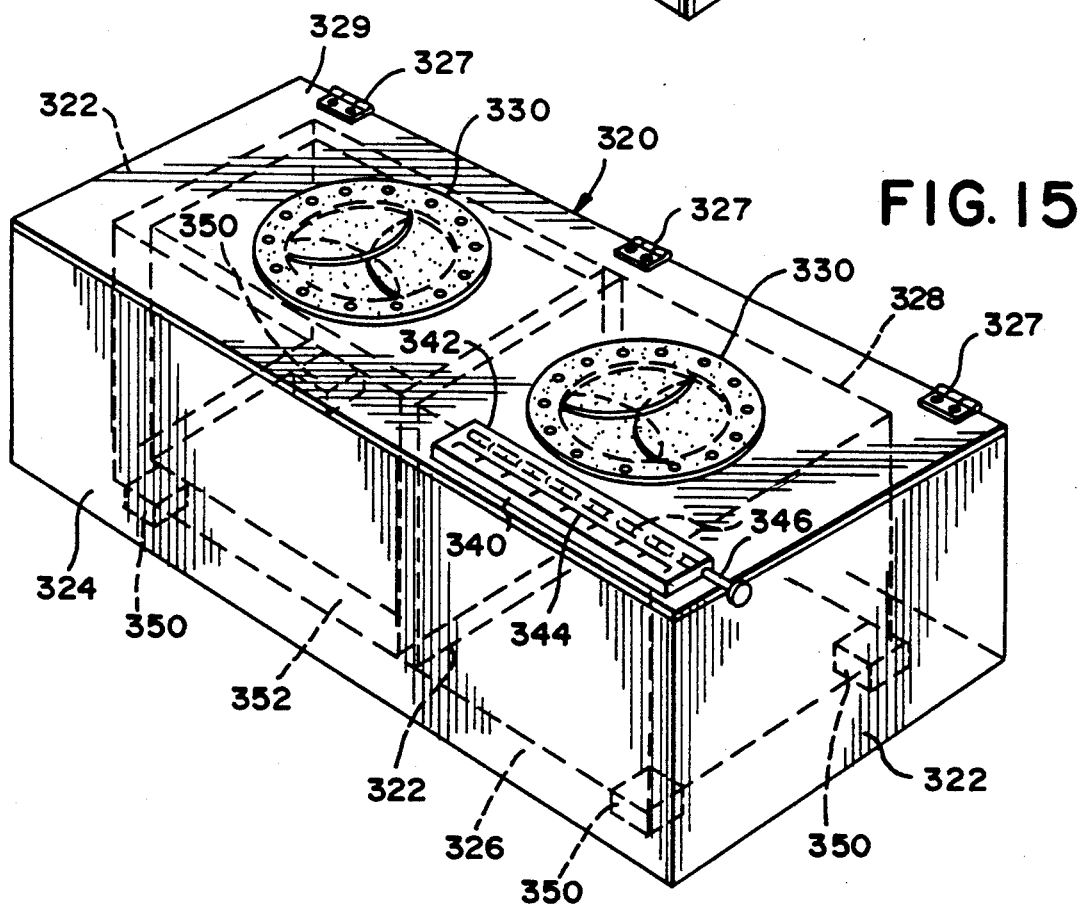
FIG. 15 is a perspective view of a device according to the present invention.

A container 320 according to the present invention shown in FIG. 15 has end walls 322, a front wall 324, a bottom 326, a rear wall 328 and a top 329 hingedly connected to the rear wall with hinges 327. Two receiving devices 330 are disposed on the top 329 over openings in the top (not shown). It is to be understood that the receiving devices 330 shown as like that in FIG. 3 represent any receiving device described herein.

A separation device 332 according to the present invention like the device 292 (FIG. 14) is disposed within the container 320.

A scale device 340 secured to or formed of the top 329 has a body 342 with an immovable scale 344 imprinted or painted thereon or embossed therein and a movable scale 346 disposed in the body 243. The movable scale 346 permits measurement of a fish or other item longer than the extent of the immovable scale 344.

Blocks 350 disposed between the bottom 326 of the container 320 and a bottom 352 of the device 332 serve to space the device 332 apart from the bottom 326 of the container permitting a layer of ice to be placed beneath the device 332. Blocks may also be placed at the sides of the device or container. The blocks or equivalent spacers may be secured to or formed of the container or the separation device; or releasably connectors may be used as spacers.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A container for keeping fish, the container comprising
    a box with a wall member defining a box interior,
    the box having a bottom and a first box opening through which fish are insertable into the box interior,
    a first separation device in the box comprising two releasably securable members, each member having a beaded end removably receivable in a recessed end of the other member, the two members defining a first interior space within the separation device and separating the first interior space from a remaining portion of the box interior so that ice is disposable beneath and around the separation device, and
    the separation device having a first top opening beneath the first box opening so that fish inserted through the first box opening enter the first interior space defined by the separation device.

2. A container for keeping fish, the container comprising
    a box with a wall member defining a box interior, the box having a bottom and a first box opening through which fish are insertable into the box interior,
    a first separation device in the box defining a first interior space within the separation device and separating the first interior space from a remaining portion of the box interior so that ice is disposable beneath and around the separation device,
    the separation device having a first top opening beneath the first box opening so that fish inserted through the first box opening enter the first interior space defined by the separation device, and
    a fish receiving device mounted at the first box opening and comprising a flexible fabric member mounted about the first box opening and having opening means therein into which and through which a fish is insertable into the box through the first box opening.

3. A container for keeping fish, the container comprising
    a box with a wall member defining a box interior,
    the box having a bottom and a first box opening through which fish are insertable into the box interior,
    a first separation device in the box defining a first interior space within the separation device and separating the first interior space from a remaining portion of the box interior so that ice is disposable beneath and around the separation device,
    the separation device having a first top opening beneath the first box opening so that fish inserted through the first box opening enter the first interior space defined by the separation device, and
    a fish receiving device mounted over or in the first box opening, the fish receiving device comprising
    a frame member mounted over the first box opening,
    a flexible member mounted to the frame member,
    the flexible member having opening means therein into which and through which a fish is insertable into the box through the first box opening, and
    the flexible member including two pieces of flexible fabric secured to the frame each with an edge meeting an edge of the other piece over the first box opening to form a receiving opening along and between the edges.

4. A container for keeping fish, the container comprising
    a box with a wall member defining a box interior,
    the box having a bottom and a first box opening through which fish are insertable into the box interior,
    a first separation device in the box having an upstanding lateral side member formed integrally of or disposed removably in the box interior and between a first interior space and a second interior space within the separation device and separating the first interior space from a remaining portion of the box interior so that ice is disposable beneath and around the separation device,
    the separation device having a first top opening beneath the first box opening so that fish inserted through the first box opening enter the first interior space.
    the second interior space apart from the first interior space, the box having a second box opening above the second interior space so that fish or other items inserted through the second box opening enter the second interior space, and
    a fish receiving device mounted over or in the second box opening, the fish receiving device comprising
    a frame member mounted over the second box opening,
    a flexible member mounted to the frame member,
    the flexible member having opening means therein into which and through which a fish or other item is insertable into the box through the second box opening, and
    the flexible member including two pieces of flexible fabric secured to the frame each with an edge meeting an edge of the other piece over the second box opening to form a receiving opening along and between the edges.

5. The container of claim 4 wherein insulation material is provided adjacent the second interior space on the upstanding lateral side member.

* * * * *